United States Patent [19]
Billot

[11] 3,967,506
[45] July 6, 1976

[54] CONTROL MECHANISM
[75] Inventor: Jean Billot, Levallois, France
[73] Assignee: Rafaut & Cie, Villeneuve-la-Garenne, France
[22] Filed: Feb. 13, 1974
[21] Appl. No.: 442,277

[30] Foreign Application Priority Data
Feb. 26, 1973  France .............................. 73.06671

[52] U.S. Cl. ..................................... 74/2; 89/1.5 R
[51] Int. Cl.² ...................... F16H 27/02; F41F 5/00
[58] Field of Search ...................... 74/2; 244/137 R; 89/1.5, 1.5 D, 1.5 C

[56]  References Cited
UNITED STATES PATENTS

| | | | |
|---|---|---|---|
| 2,393,312 | 1/1946 | Davenport | 74/2 |
| 3,057,652 | 10/1962 | Geffner et al. | 89/1.5 R |
| 3,081,121 | 3/1963 | Campbell | 74/2 |
| 3,088,608 | 5/1963 | Theodore | 244/137 R |
| 3,236,106 | 2/1966 | Krupp et al. | 74/2 |
| 3,677,507 | 7/1972 | Kendall et al. | 244/137 |

Primary Examiner—Benjamin W. Wyche
Assistant Examiner—Wesley S. Ratliff, Jr.
Attorney, Agent, or Firm—Alan H. Levine

[57] ABSTRACT

A control mechanism is provided for tripping a system in a releasable missile. The control transmission which controls tripping of the system comprises an energy store held under stress by a locking member. The locking member is designed to be actuated on completion of unwinding of the storage pulley thereby to release the energy store and so initiate tripping of the system connected to it. The invention has a particular application in releasable missiles such as bombs which are transported by aircraft.

9 Claims, 3 Drawing Figures

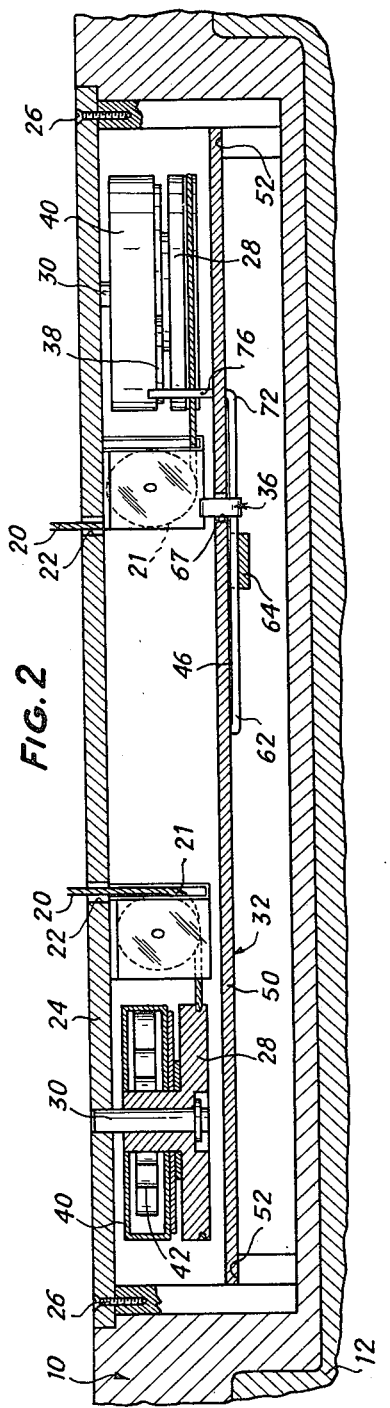
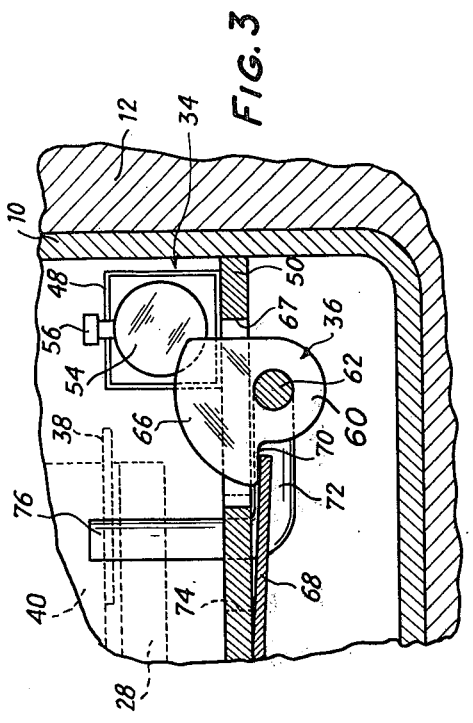

CONTROL MECHANISM

BACKGROUND OF THE INVENTION

This invention relates to mechanical-traction trip-control mechanisms for releasable missiles.

Most releasable missiles, especially bombs, are equipped with a certain number of control systems (detonation fuses, wind propellers, braking parachutes) which have to be tripped with a certain delay primarily for reasons of safety when the missile is released.

French Pat. No. 2,096,948 relates to a mechanism in which each system is trip-controlled when the missile is released by offwinding a certain length of a traction cable which is connected to the transporting aircraft by a connection of limited resistance and which is wound onto a storage pulley designed to actuate, on completion of offwinding, a control transmission which controls tripping of the system, retaining means being provided to delay actuation of this transmission as long as the force applied to it by the storage pulley remains below a predetermined value.

SUMMARY OF THE INVENTION

The object of the present invention is to provide a new control transmission for the mechanism defined above which guarantees effective tripping of the system when the missile equipped with the control mechanism according to the invention is released.

According to the invention there is provided a control mechanism for tripping a system in a missile, the missile being adapted to be released from a transporting vehicle to which it is connected by a length of traction cable of limited traction resistance, the said mechanism comprising:

a. a storage pulley on which the traction cable is wound;
b. a trip control;
c. energy storage means adapted when its energy is released to actuate the said trip control;
d. a locking member having a locking position in which it maintains the energy storage means in an energy storing condition;
e. means operable by the storage pulley on complete unwinding of the cable therefrom for moving the locking member out of its locking position; and
f. retaining means for preventing operation of the said moving means when the force applied to the storage pulley is below a predetermined value.

In one preferred embodiment, the energy store is in the form of an elastic element compressed between a fixed support and a mobile element designed to control tripping of the system, the locking member forming a retractable stop designed to keep the mobile element in position when it comes into contact with the elastic element. The mobile element is preferably connected to the end of a wire designed to actuate by traction tripping of the system connected to its other end.

Actuation of the control member can with advantage be controlled by a finger mounted for rotation about the axis of the storage pulley to which it is connected by a helical spring, the aforementioned retaining means preventing the finger from rotating for as long as the torque applied to the finger by the helical spring remains below a predetermined value.

BRIEF DESCRIPTION OF THE DRAWINGS

FIG. 2 is a section on the line II—II of FIG. 1.

FIG. 3 is a view, partly in section, on a larger scale on the line III—III of FIG. 1.

DETAILED DESCRIPTION OF THE INVENTION

Figure 1:
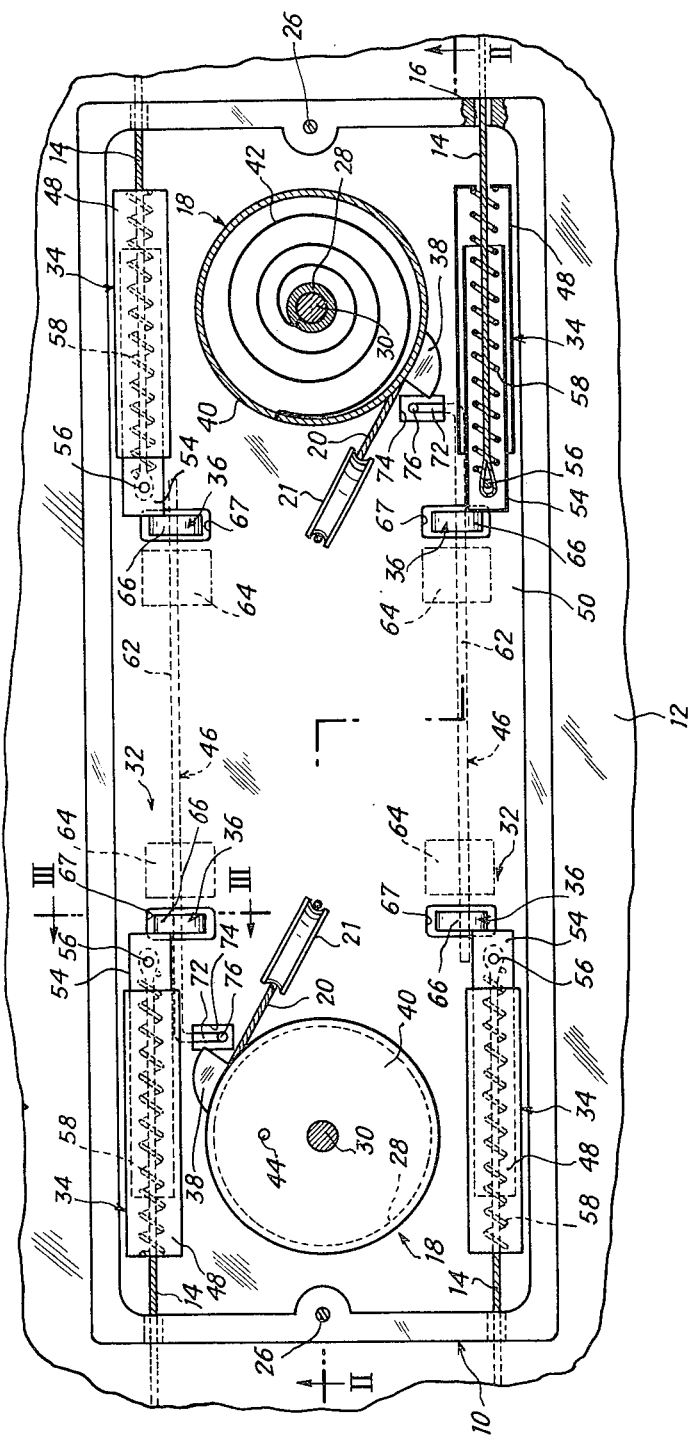
FIG. 1 is a view from beneath, partly in section and detached, of a cover of an embodiment of trip-control mechanism according to the invention.

In the drawings, the reference 10 denotes a housing suitably fixed in the central part 12 of a releasable missile (not shown), such as a bomb. A bomb of this kind is equipped in the usual way with a certain number of systems (not shown), which, once they have been tripped, control for example arming of the fuse (s) of the missile, rotation of the wind propellers or even opening of the braking parachute of the bomb in the case of a decelerated bomb.

In the embodiment illustrated, these various systems are trip-controlled by pulling the ends of four cables 14 slidably mounted in suitable bores (not shown) formed inside the bomb and opening into the housing 10 through orifices 16 formed in the housing 10.

The systems connected to the cables 14 are actuated by traction in pairs through two identical control mechanisms 18 arranged in the housing 10 in such a way that they can each be controlled by pulling a cable 20 which, after passing round a pulley 21, passes through an opening 22 formed in a cover 24 closing the housing 10 to which it is removably fixed, for example by screws 26. The free end of each of these traction cables 20 is equipped with a ring (not shown) capable of being fixed to the transporting aircraft through a connection of limited traction resistance formed in known manner, for example by electromagnets.

Each control mechanism 18 consists essentially of a storage pulley 28 pivotally mounted on a spindle 30 fixed by any suitable known means to the cover 24, and of a control transmission denoted by the general reference 32 which controls tripping of each of the systems connected to the cables 14 under the conditions defined hereinafter.

More precisely, each transmission 32 consists essentially of two energy accumulators 34 each associated with a cable 14 and normally held under stress by two locking members 36, and of a finger 38 integral with a drum 40 mounted for rotation about the spindle 30 of the pulley 28 to actuate the members 36. The drum 40 is connected to the pulley 28 by a helical spring 42 and is held on the cover 24 in the normal angular position illustrated by a pin 44 designed to shear when the drum 40 is subjected to a torque above a given value. The two locking members 36 are actuated by the finger 38 through a suitable mechanical connection 46 which is common to the two locking members 36 and which, preferably, is completely independent of the cover 24.

In the embodiment illustrated, each energy accumulator 34 consists of a cylindrical case 48 of square cross-section which is fixed to a baseplate 50 held inside the housing 10 on suitable shoulders 52 provided in the housing, and of a mobile sleeve 54 connected through a locking screw 56 to the free end of the cable 14 associated with the accumulator 34. A compression spring 58 is compressed between the bottom of the case 48, through which the cable 14 extends, and the sleeve 54 so as to force the sleeve 54 against the locking member 36. As shown in particular in FIG. 3, the locking member 36 consists essentially of a stop 60 mounted for rotation about a pin 62 pivotally mounted on the inner surface of the baseplate 50 through two bearings 64. The stop 60 is provided with an eccentric surface 66 which extends radially outwards through an opening 67 in the plate 50 so as to define a stop for the mobile sleeve 54 which is designed to be retracted when the stop 60 is rotated about its pin 62 in an anticlockwise direction in FIG. 3. An elastic element, such as a leaf spring 68, is preferably fixed to the plate 50 to cooperate with a recess 70 in the stop 60 to keep the stop in its normal position illustrated in FIG. 3.

Rotation of the stops 60 about the pin 62 is controlled by the connection 46 which, as in the embodiment illustrated, consists simply of a crank whose arm 72 extends through an opening 74 formed in the baseplate 50 so that the end 76 of the crank arm 72 is situated in the vicinity of the finger 38 on the path followed by the finger resulting, as explained hereinafter, from expansion of the helical spring 42 on completion of unwinding of the pulley 28 after the pin 44 has sheared.

The mechanism described above operates as follows:

When the missile is released, the traction resulting from separation of the transporting aircraft and of the missile causes the length of cable 20 wound onto each of the pulleys 28 to be offwound. After the cable 20 has been offwound, the helical spring 42 subjects the drum 40 to such a torque that the pin 44 is sheared whilst the unit formed by the drum 40 and the finger 38 integral with it is rotated about the spindle 30 in a clockwise direction in FIG. 1. During this displacement, the finger 38 comes into contact under the action of the spring 42 with the end 76 of the crank arm 72 and rotates the pin 62 and, hence, the two stops 60 which are integral with it. When rotation of these two stops against the return force applied by the spring 68 exceeds a relatively low predetermined angular value, the eccentric surface 66 moves out of the path of the mobile sleeve 54 which is thus displaced towards the interior of the housing 10, taking with it the end of the corresponding cable 14 under the action of the compression spring 58 which trips the system (s) controlled by this cable.

It should be noted that division of the control transmission 32 into two independent cooperating sections, one of which is arranged on the cover 24 (namely the finger 38, the drum 40 and the spring 42) whilst the other is accommodated in the housing (namely the crank 46, the stops 60 and the accumulators 34), enables the required adjustments to be simplified by allowing removal of the cover equipped with the corresponding transmission section, without any danger of premature trip control.

It is obvious that the invention is by no means confined to the embodiment described above and illustrated in the accompanying drawings. Numerous modifications relating in particular to the form of the transmission link 32, the design and arrangement of each of the energy accumulators 34, the form and configuration of the locking members 36 each keeping the corresponding accumulator under stress, the form and arrangement of the assembly 38/40 controlling actuation of the link 32 after unwinding of the pulley 28, fall within the scope of the invention as defined in the following claims.

I claim:

1. In a missile adapted to be carried by an aircraft and having a traction cable extending from the missile to the aircraft, a control mechanism for tripping a system in the missile the control mechanism comprising:

a. a storage pulley on which the traction cable is wound,
   b. a trip control element for tripping a system of the missile,
   c. energy storage means for actuating said trip control element upon release of the energy in said energy storage means,
   d. a locking member movable between a locking position, in which it holds said energy storage means in an energy storing condition, and a release position, in which it permits said energy storage means to actuate said trip control element, and
   e. movable means responsive to substantially complete unwinding of the traction cable from said storage pulley for moving said locking member from its locking position to its release position, whereupon said energy storage means actuates said trip control element to trip the system in the missile.

2. A control mechanism as defined in claim 1 including retaining means for preventing said movable means from moving said locking member until the force applied to said movable means by said storage pulley rises above a predetermined value.

3. A control mechanism as defined in claim 1 wherein said energy storage means includes a support fixed with respect to the missile, a mobile element, and resilient means compressed between said support and mobile element, said trip control element being operatively connected to said mobile element, and said locking member includes a stop for restraining movement of said mobile element against the force of said resilient means.

4. A control mechanism as defined in claim 3 wherein said trip control element includes a cable, and said mobile element is connected to one end of said cable.

5. A control mechanism as defined in claim 3 wherein said stop is mounted for rotation about a fixed axis, said stop having a radially extending eccentric portion arranged to be abutted by said mobile element, said eccentric portion being movable out of the path of movement of said mobile element upon rotation of said stop.

6. A control mechanism as defined in claim 2 wherein said movable means includes a finger mounted for rotation about the axis of rotation of said storage pulley, and a spiral spring interconnecting said finger and said storage pulley, and said retaining means prevents rotation of said finger until the force applied to said finger by said spring rises above a predetermined value.

7. A control mechanism as defined in claim 6 wherein said retaining means includes a shearable pin extending between said finger and a part fixed with respect to the missile.

8. A control mechanism as defined in claim 6 including a crank for rotating said locking member, said crank having an arm arranged in the path of movement of said finger, and said finger when it moves engaging said arm and rotating said locking member from its locking position to its release position.

9. A control mechanism as defined in claim 1 including resilient means for maintaining said locking means in its locking position until said movable means applies a force to said locking means sufficient to overcome the force of said resilient means.

\* \* \* \* \*